United States Patent [19]
Stephenson

[11] Patent Number: 5,871,346
[45] Date of Patent: Feb. 16, 1999

[54] FLASHLAMP ARRAY VENTING STRUCTURE

[75] Inventor: Stanley W. Stephenson, Spencerport, N.Y.

[73] Assignee: Eastman Kodak Company, Rochester, N.Y.

[21] Appl. No.: 789,677

[22] Filed: Jan. 24, 1997

[51] Int. Cl.[6] .............................. F21K 5/00; G03B 15/03
[52] U.S. Cl. .............................. 431/365; 362/11; 362/12; 396/155; 396/191; 431/357; 431/359; 431/361
[58] Field of Search ................................ 431/357–362, 431/364, 365; 396/155, 191, 192, 193; 362/10–15

[56] References Cited

U.S. PATENT DOCUMENTS

| 1,179,335 | 4/1916 | Porter ...................................... 431/364 |
| 1,780,509 | 11/1930 | Skinner . |
| 2,034,029 | 3/1936 | Froehlich ................................ 431/364 |
| 2,279,880 | 4/1942 | DeMargitta ............................ 431/358 |
| 2,280,048 | 4/1942 | Schwarze ............................... 431/358 |
| 2,393,711 | 1/1946 | Schwarze ................................. 67/31 |
| 3,280,601 | 11/1966 | Ostrow .................................... 431/365 |
| 3,439,992 | 4/1969 | Shaffer et al. ........................... 431/93 |
| 3,511,586 | 5/1970 | Kopelman et al. ...................... 431/93 |
| 3,540,820 | 11/1970 | Shaffer ..................................... 431/93 |
| 3,612,849 | 10/1971 | Beach ..................................... 431/361 |
| 3,706,521 | 12/1972 | Kopelman et al. ...................... 431/93 |
| 3,751,656 | 8/1973 | Buckler et al. .......................... 240/1.3 |
| 3,873,260 | 3/1975 | Cote ......................................... 431/95 |
| 4,055,759 | 10/1977 | Bouchard et al. ...................... 431/361 |
| 4,154,569 | 5/1979 | vanWerkhoven ........................ 91/357 |
| 4,233,023 | 11/1980 | Johnson et al. ........................ 431/362 |
| 4,347,053 | 8/1982 | Fohl et al. .............................. 431/359 |
| 5,090,891 | 2/1992 | Hemsath .................................... 431/1 |

FOREIGN PATENT DOCUMENTS

| 781865 | 5/1923 | France . |
| 679735 | 8/1939 | Germany ................................ 431/365 |
| 403637 | 3/1933 | United Kingdom .................... 431/358 |
| 410307 | 3/1933 | United Kingdom .................... 431/358 |
| 403638 | 12/1933 | United Kingdom .................... 431/358 |

*Primary Examiner*—Ira S. Lazarus
*Assistant Examiner*—David Lee
*Attorney, Agent, or Firm*—Thomas H. Close

[57] ABSTRACT

A compact flash lamp array includes a housing defining a plurality of cavities, each cavity having a light emitting opening and an exhaust vent and containing a combustible mass. A transparent cover is fixed over the light emitting opening and means are provided for individually firing the combustible mass in each cavity. A valve cooperating with the exhaust vents opens the exhaust vent of a cavity in which a combustible mass is fired and closes the cavities containing unfired combustible masses.

17 Claims, 2 Drawing Sheets

FLASHLAMP ARRAY VENTING STRUCTURE

CROSS-REFERENCE TO RELATED APPLICATIONS

The present application is related to U.S. application Ser. No. 08/769,338, filed Dec. 19, 1996, by Stanley W. Stephenson, and entitled, "Improved Photoflash Particle Mixture"; U.S. application Ser. No. 08/788,005, filed Jan. 24, 1997, by Stanley W. Stephenson, and entitled, "Photo Flash Lamp Array"; and U.S. application Ser. No. 08/744,782, filed Nov. 6, 1996, by Stanley W. Stephenson, and entitled, "Flash Lamp Array With Porous Vent", now U.S. Pat. No. 5,720,610, issued Feb. 24, 1998.

FIELD OF THE INVENTION

The invention relates generally to the field of photography, and in particular to a compact array of flash lamps containing combustible material.

BACKGROUND OF THE INVENTION

Currently available single use cameras with flash illumination are provided with electronic flash. The electronic flash unit is relatively expensive, representing a significant portion on the overall cost of the camera. Although the electronic flash unit may be recovered and recycled a number of times, thereby reducing the effective cost of the electronics, it has been observed that an array of chemical flash lamps could be an attractive alternative to electronic flash in single use cameras and related applications.

U.S. Pat. No. 4,347,053 issued Aug. 31, 1982, to Fohl et al. discloses a flash illumination assembly having a plurality of electrically fired flash lamps located in a circular housing. The combustion products from the individual flash lamps are vented into a common central expansion chamber that is an integral part of the flash lamp array. One problem associated with such an array of flash lamps is that the combustion products emitted from one of the flash lamps into the common central expansion chamber may ignite others of the flash lamps, thereby causing a "chain fire". Another further problem with this arrangement is that combustion products from the fired lamps will enter and fog the unfired lamps.

There is a need therefore for an improved array of flash lamps.

SUMMARY OF THE INVENTION

The present invention is directed to overcoming one or more of the problems set forth above. Briefly summarized, according to one aspect of the present invention, a compact flash lamp array includes a housing defining a plurality of cavities, each cavity having a light emitting opening and an exhaust vent and containing a combustible mass. A transparent cover is fixed over the light emitting opening and means are provided for individually firing the combustible mass in each cavity. A valve cooperating with the exhaust vents opens the exhaust vent of a cavity in which a combustible mass is fired and closes the cavities containing unfired combustible masses.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages. The valved venting of the flash lamps in the flash lamp array according to the present invention permits the use of a common vent cavity, while eliminating the possibility of chain fire and preventing the combustion by-products from fired flash lamps from fouling adjacent lamps.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
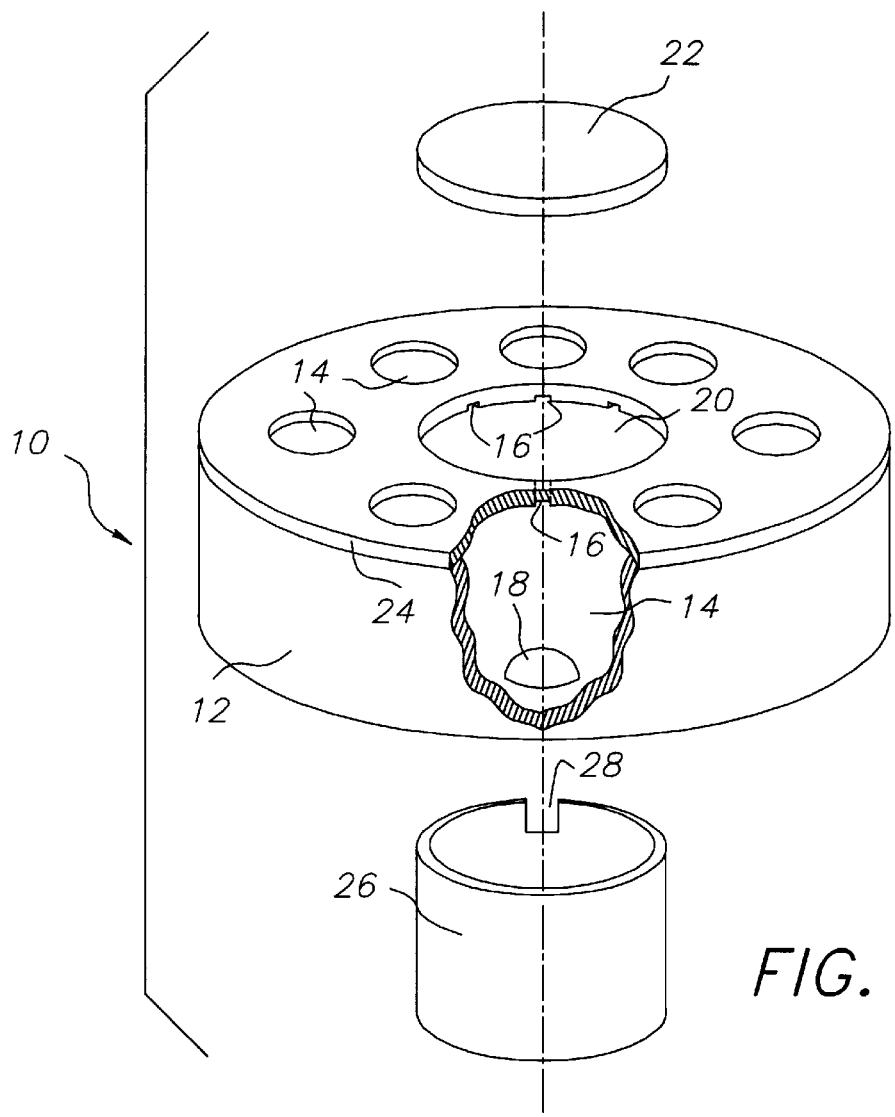
FIG. 1 is an exploded perspective view, partially broken away, of a flash lamp array according to the present invention.

Referring to FIG. 1, the flash lamp array 10 of the present invention includes a circular housing 12 defining a plurality of cavities 14 having a volume of between 0.5 and 1.5 cc. The circular housing 12 is preferably an acrylic polymer loaded with a high concentration of titanium dioxide or other filler that has high reflectivity.

Alternatively, the housing 12 is an engineering plastic such as polycarbonate that is vacuum coated with reflective aluminum. Alternatively, the housing 12 may be coated with a highly reflective electroless nickel coating. In a still further alternative, the housing 12 is formed as an aluminum extrusion that is chemically polished. In a still further alternative, the housing 12 is chemically polished die cast aluminum.

According to the present invention, the cavity 14 includes an exhaust vent 16. A combustible mass 18 is deposited at the bottom of each cavity 14. The exhaust vent 16 from the cavity 14 vents into a venting chamber 20 in the center of the flash lamp array which contains the combustion by-products of combustible mass 18 when combustible mass 18 is ignited. A filter 22 secured over the venting chamber 20 prevents particulate materials from escaping to the atmosphere. A sheet 24 of transparent material is bonded to the top of the housing 12 to cover the cavities 14 in housing 12 and complete the enclosures for the flash lamp array 10. The transparent sheet 24 may be, for example, 1 mm thick glass, 0.5 mm thick glass coated plastic with the glass coating on the inside of the chamber, or 0.5 mm thick acrylic. The transparent sheet 24 is bonded to the housing 12 with an adhesive such as epoxy or silicone rubber.

In a preferred embodiment, the filter 22 is a disk of porous plastic or ceramic 2.5 mm thick. A suitable porous ceramic is FAO-5 grade ceramically bonded alumina available from the Ferro Corporation, East Rochester, N.Y. This material has a maximum pore diameter of 40 $\mu$m and a probable nominal particle retention of 5 $\mu$m. The material has a porosity from 20 to 50%, nominally 35%. The particles are bonded ceramically to resist temperatures up to 2000° F. It is also possible to use glass bonded silica which can resist temperatures up to 800° F. Experiments have shown that materials with pore sizes varying from 25 to 120 $\mu$m perform well in this application.

Alternatively, a porous plastic such as porous polyethylene available from Porex Technologies, Fairbum, Ga. can be used.

The combustible mass 18 may ignited by an electrical or percussively fired igniter. A suitable electrical igniter may be, for example a 25 μm diameter copper wire, connectable to an electrical power source, such as a battery. Combustible mass 18 is deposited directly over the igniter link. Preferably, the combustible mass 18 is a mixture of coarsely powdered zirconium (−320 sieve), finely powdered zirconium (5am zirconium dust), an oxidizer such as a chlorate or perchlorate (preferably −200 and +400 sieve potassium perchlorate), and polymeric binder (preferably polyacrylamide (PAA)) all dispersed in water. A mass of 22 to 40( mg (preferably 35 mg) of the resulting slurry are deposited onto the igniter links and oven dried at 90° C. for 24 hours. The resulting combustible mass 18 is capable of ignition with a single alkaline AA battery to produce approximately 120 candela seconds of illumination.

Alternatively, the combustible mass 18 may be ignited by a percussion activated primer mass. A primer vent is formed in the bottom of cavity 14 and the primer mass is deposited on the bottom of flash array 10 over the primer vent opposite the combustible mass 18. Preferably the primer mass is a mixture of red phosphorus, potassium chlorate, and silicone dioxide powders in a ratio of 1:2:3. An equal mass of water containing 1% PAA binder is combined with the powder mixture to form a primer slurry. 2 to 10 mg of the primer slurry is applied over primer vent and dried at 90° C. for 30 minutes. When dried, the primer mass varies in height between 0.003 and 0.012 inches. The bottom of housing 12 performs as an anvil for the primer mass .

A primer cover comprising a deformable sheet of material may be secured over each primer mass to direct the combustion products of the primer mass through primer vent into cavity 14 to ignite combustible mass 18. The primer cover serves to hold the primer mass in place over the primer vent. The primer cover is formed of a material that can resist extremely high temperatures and have sufficient thickness to resist rupture from the shock and pressure from detonation of the primer mass. The primer covers must also be able to efficiently transfer impact energy from a firing pin employed to ignite the primer mass. The adhesive employed to hold the primer cover over the primer mass must have sufficient adhesion to the bottom of housing 12 to resist failure on ignition of the primer mass.

In one embodiment, the primer cover is an adhesive backed 2 mil aluminum foil (e.g. Scotch 1170 brand aluminum tape available from the 3M Corporation). The adhesive backed foil may be applied in individual patches over each primer mass, or a single sheet of adhesive backed foil is applied the back of the housing and secured over the primer masses to separately enclose each mass. Alternatively, 1.4 mil adhesive backed copper foil (e.g. Scotch 1181 brand copper tape available from the 3M Corporation) may be used to form the primer covers. Alternatively, an adhesive such as silicone rubber or an epoxy is applied to the bottom of housing 12 and a metallic foil such as copper or aluminum is secured over the primer masses. Preferably, the metal foil is annealed to provide the ductility necessary to form a tent like shape over the primer masses without detonating the primer masses.

A rotary valve 26 having a cylindrical body that fits snugly into venting chamber 20 to block exhaust vents 16 defines an opening 28 that is alignable with any one of the vents 16 to open the vent to the venting chamber 20, while covering the remaining exhaust vents 16. Relative rotation between valve 26 and housing 12 may be used to position opening 28 over the exhaust vent 16 corresponding to the next flash lamp to be fired. The valve 26 allows the fired flash lamp to vent into venting chamber 20 while preventing combustion by products form entering the other cavities 14.

Figure 2:
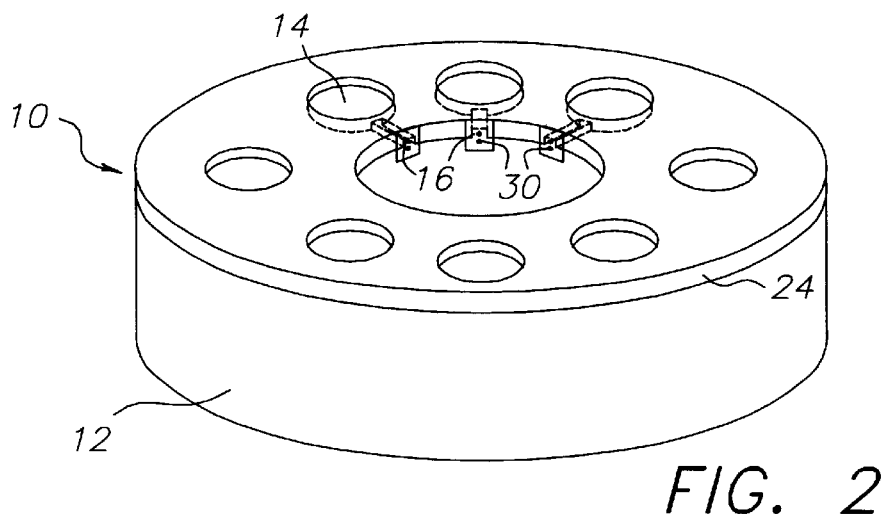
FIG. 2 is a perspective view of an alternative embodiment of a flash lamp array according to the present invention.

Referring to FIG. 2, the valves over the exhaust vents 16 may be reed valves 30. The reed valves may be formed from small sheets 2 mil of aluminized Mylar attached on one end to the inside of housing 12 for example by an adhesive or thermal deformation bonding.

Figure 3:
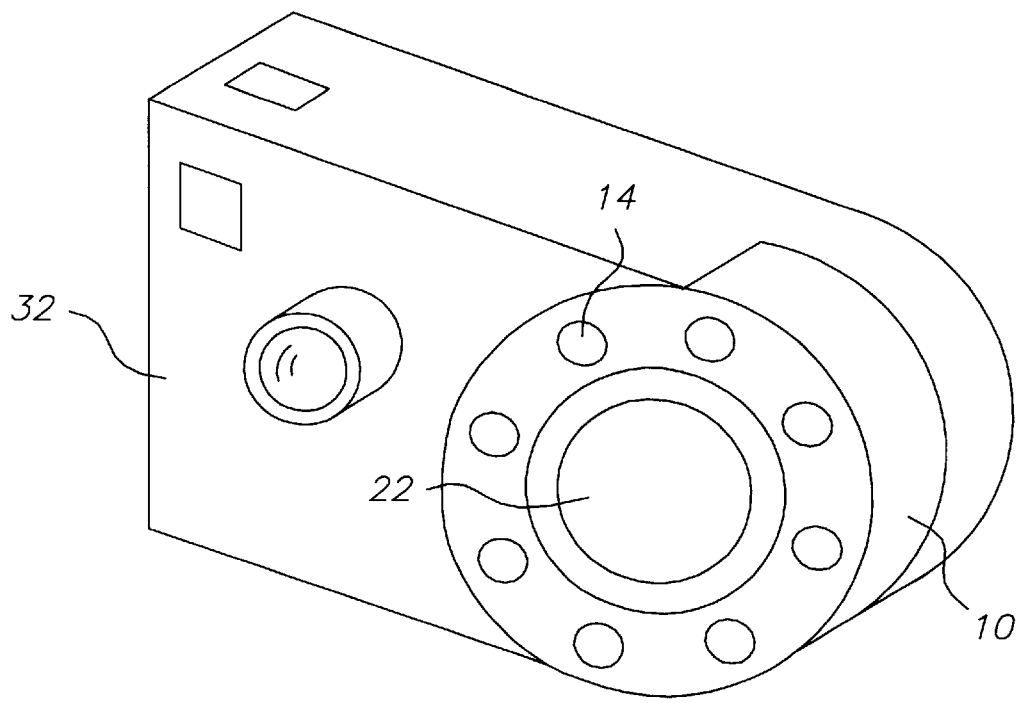
FIG. 3 is a perspective view of a single use camera including a flash array according to the present invention.
Figure 4:
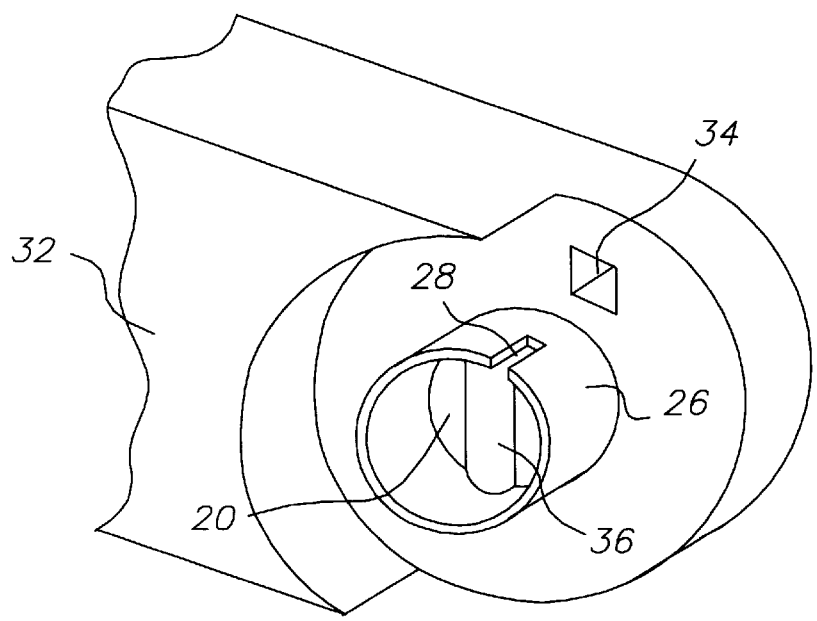
FIG. 4 is a partial perspective view of the single use camera shown in FIG. 3, with the flash lamp array removed to show a valve structure according to the present invention.

As shown in FIGS. 3 and 4, the flash lamp array 10 according to the present invention may be incorporated in a single use camera 32. The single use camera 32 includes a flash ignition mechanism 34, such as an electrical circuit with contacts for 20 applying current to the igniter links in the case of the electrically fired flash lamp array, or a mechanically operated firing pin associated with a shutter mechanism (not shown) in the case of the percussively fired flash lamps as is known in the prior art. The camera 32 includes a mechanism (not shown) to rotate flash lamp array 10 after each exposure of the camera 32 to place an unfired flash lamp in position to be fired by flash firing mechanism 34. The valve 26 having its opening 28 disposed adjacent the flash firing mechanism 34 is an integral part of the body of camera 32. As each unfired flash lamp is positioned to be fired by flash firing mechanism 34, the valve 26 opens the corresponding exhaust vent 16 in the flash lamp array 10.

As shown in FIG. 4, which shows the body of the camera with flash lamp housing 12 removed, a film storage (take-up or supply) compartment 36 may be located in the venting chamber 20. This arrangement has the advantage of being compact. It has been found that a simple plastic wall 0.050 inches thick is effective to protect the film from light leak and thermal damage from the flash lamps in the array.

The invention has been described with reference to a preferred embodiment. However, it will be appreciated that variations and modifications can be effected by a person of ordinary skill in the art without departing from the scope of the invention.

I claim:

1. A compact flash lamp array, comprising:
   a) a housing defining a plurality of cavities, each cavity having a light emitting opening and an exhaust vent;
   b) a transparent cover fixed over the light emitting opening;
   c) a combustible mass deposited in each cavity;
   d) means for individually firing the combustible mass in each cavity; and
   e) a rotary valve cooperating with the exhaust vents for opening the exhaust vent of a cavity in which a combustible mass is fired and closing the cavities containing unfired combustible masses.

2. The compact photoflash lamp array claimed in claim 1, wherein the means for firing the combustible mass is an electrically heated element.

3. The compact photoflash lamp array claimed in claim 1, wherein the means for firing the combustible mass is a percussively fired primer.

4. The compact flash lamp array claimed in claim 3, wherein the percussively fired primer is a mixture of red phosphorus, potassium chlorate, and silicone dioxide powders in a ratio of 1:2:3.

5. The compact flash lamp array claimed in claim 1, further comprising a venting chamber in communication with each exhaust vent.

6. The compact flash lamp array claimed in claim 5, wherein the venting chamber defines an opening to the atmosphere and further comprising a filter over the opening.

7. The compact flash lamp array claimed in claim 6, wherein the flash array is a circular array having the venting chamber in the center of the array.

8. The compact flash lamp array claimed in claim 6, wherein the filter is a porous plastic.

9. The compact flash lamp array claimed in claim 8, wherein the porosity is between 25 and 50%, and the pores are less than 50 µm.

10. The compact flash lamp array claimed in claim 1, wherein a component of the rotary valve is integral with a camera body.

11. The compact flash lamp array claimed in claim 10, wherein the flash lamp array is an integral part of a single use camera.

12. The compact flash lamp array claimed in claim 1, wherein the combustible mass is finely divided zirconium powder and potassium perchlorate in polymeric binder.

13. A compact flash lamp array, comprising:
   a) a housing defining a plurality of cavities, each cavity having a light emitting opening and an exhaust vent;
   b) a transparent cover fixed over the light emitting opening;
   c) a combustible mass deposited in each cavity;
   d) means for individually firing the combustible mass in each cavity;
   e) valve means cooperating with the exhaust vents for opening the exhaust vent of a cavity in which a combustible mass is fired and closing the cavities containing unfired combustible masses; and
   a venting chamber in communication with each exhaust vent, wherein the venting chamber defines an opening to the atmosphere and further comprising a filter over the opening, wherein the filter is a porous ceramic.

14. A compact flash lamp array, comprising:
   a) a housing defining a plurality of cavities, each cavity having a light emitting opening and an exhaust vent;
   b) a transparent cover fixed over the light emitting opening;
   c) a combustible mass deposited in each cavity;
   d) means for individually firing the combustible mass in each cavity; and
   e) valve means cooperating with the exhaust vents for opening the exhaust vent of a cavity in which a combustible mass is fired and closing the cavities containing unfired combustible masses, wherein a component of the valve means is integral with a camera body, wherein the flash lamp array is an integral part of a single use camera, and wherein the flash array is a circular array having a venting chamber in the center of the array, and the component of the valve means on the camera comprises a rotary valve.

15. The compact flash lamp array claimed in claim 14, wherein the rotary valve cooperates with a flash firing mechanism on the camera to open the vent on the cavity that is positioned to be fired.

16. The compact flash lamp array claimed in claim 14, wherein the camera includes a film storage compartment disposed within the venting chamber.

17. A compact flash lamp array, comprising:
   a) a housing defining a plurality of cavities, each cavity having a light emitting opening and an exhaust vent;
   b) a transparent cover fixed over the light emitting opening;
   c) a combustible mass deposited in each cavity;
   d) means for individually firing the combustible mass in each cavity; and
   e) valve means cooperating with the exhaust vents for opening the exhaust vent of a cavity in which a combustible mass is fired and closing the cavities containing unfired combustible masses, further comprising means moveable relative to the housing for activating the individual firing means, and means responsive to relative motion of the activating means and the housing means for activating the valve means.

* * * * *